(12) United States Patent
Hinrich et al.

(10) Patent No.: US 9,989,105 B2
(45) Date of Patent: Jun. 5, 2018

(54) ELECTRIC ACTUATOR

(71) Applicant: Dr. Ing. h.c. F. Porsche Aktiengesellschaft, Stuttgart (DE)

(72) Inventors: Holger Hinrich, Leonberg (DE); Oliver Fischer, Rottenburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 187 days.

(21) Appl. No.: 14/629,562

(22) Filed: Feb. 24, 2015

(65) Prior Publication Data

US 2015/0260235 A1 Sep. 17, 2015

(30) Foreign Application Priority Data

Mar. 14, 2014 (DE) .................. 10 2014 103 471

(51) Int. Cl.
- *F16D 13/72* (2006.01)
- *F16D 28/00* (2006.01)
- *F16D 48/06* (2006.01)

(52) U.S. Cl.
CPC ............ *F16D 13/72* (2013.01); *F16D 28/00* (2013.01); *F16D 48/06* (2013.01); *F16D 2300/0214* (2013.01); *F16D 2500/1021* (2013.01); *F16D 2500/1066* (2013.01); *F16D 2500/10412* (2013.01); *F16D 2500/5106* (2013.01); *F16D 2500/70448* (2013.01)

(58) Field of Classification Search
CPC ......... F16D 2300/021; F16D 2300/024; F16D 2048/029

See application file for complete search history.

(56) References Cited

U.S. PATENT DOCUMENTS

| | | | |
|---|---|---|---|
| 6,502,659 B2 | 1/2003 | Akasaka | |
| 6,619,933 B2 | 9/2003 | Ikeda | |
| 7,754,977 B2 | 7/2010 | Meyer | |
| 8,660,766 B2 | 2/2014 | Ergun et al. | |
| 2001/0054831 A1 | 12/2001 | Akasaka | |
| 2002/0025265 A1 | 2/2002 | Ikeda | |

(Continued)

FOREIGN PATENT DOCUMENTS

| | | |
|---|---|---|
| DE | 196 45 635 | 4/1998 |
| DE | 199 58 189 | 6/2001 |

(Continued)

OTHER PUBLICATIONS

Masahiro. Machine Translation of JP2014019334. Espacenet Machine Translation.*
German Search Report dated Aug. 28, 2014.

*Primary Examiner* — Huan Le
*Assistant Examiner* — Lori Wu
(74) *Attorney, Agent, or Firm* — Gerald E. Hespos; Michael J. Porco; Matthew T. Hespos

(57) ABSTRACT

An electric actuator (32) for a clutch arrangement (26, 28, 52) of a motor vehicle (10) has an electric drive unit (40) for providing mechanical driving force, an electric control unit (38) that is connected to the electric drive unit (40) to control the drive unit (40), and a cooling element (42) that is connected thermally to electric components of the drive unit (40) and/or the control unit (38). The cooling element (42) is assigned a coolant line (44), through which a coolant can be conducted to dissipate heat from the electric components.

8 Claims, 2 Drawing Sheets

(56) References Cited

U.S. PATENT DOCUMENTS

| | | | |
|---|---|---|---|
| 2014/0021808 A1 | 1/2014 | Palfenier et al. | |
| 2014/0105768 A1* | 4/2014 | Franz | F04B 9/02 |
| | | | 417/415 |
| 2014/0232217 A1 | 8/2014 | Miyama et al. | |
| 2015/0053046 A1* | 2/2015 | Ibusuki | B60W 10/119 |
| | | | 74/665 B |
| 2016/0272134 A1* | 9/2016 | Mackowiak | B60K 6/22 |

FOREIGN PATENT DOCUMENTS

| | | | |
|---|---|---|---|
| DE | 10 2008 026 553 | 12/2009 | |
| DE | 11 2012 003 901 | 8/2014 | |
| EP | 1 096 647 | 5/2001 | |
| JP | H09277245 A | 10/1997 | |
| JP | 2002002549 A | 1/2002 | |
| JP | 2006207495 A | 8/2006 | |
| JP | 2002070743 A | 3/2008 | |
| JP | 2012091561 A | 5/2012 | |
| JP | 2014019334 A | 3/2014 | |
| WO | 2006/131428 | 12/2006 | |
| WO | WO2013/172258 | * 11/2013 | B60K 17/34 |

\* cited by examiner

ELECTRIC ACTUATOR

CROSS REFERENCE TO RELATED APPLICATION

This application claims priority under 35 USC 119 to German Patent Appl. No. 10 2014 103 471.6 filed on Mar. 14, 2014, the entire disclosure of which is incorporated herein by reference.

BACKGROUND

1. Field of the Invention

The invention relates to an electric actuator for a clutch arrangement of a motor vehicle having an electric drive unit for providing mechanical driving force. An electric control unit is connected to the electric drive unit to control the drive unit and has a cooling element connected thermally to electric components of the drive unit and/or the control unit. The invention also relates to a clutch arrangement for a drive train of a motor vehicle. The invention further relates to a motor vehicle drive train for a hybrid drive having a drive unit connected to a clutch arrangement for transmitting drive power. Finally, the invention relates to a motor vehicle having a coolant circuit and having a drive train for providing drive power 2. Description of the Related Art A friction clutch often is used to couple or decouple a drive motor/engine as required to the output. A separating clutch also is known in hybrid drive technology to decouple the internal combustion engine from the hybrid module or the electric drive to realize a purely electric drive.

Separating clutches of this type are usually configured as friction clutches and are actuated or correspondingly opened or closed by an electric actuator. The electric actuator usually has an electric motor that exerts a pressing force on the clutch via a spindle and is actuated or energized electrically by a control unit. The clutch is configured either as a dry clutch or as a wet clutch. Heat is produced during operation of the electric actuator and must be dissipated.

The electric actuators of the clutches usually are situated in the motor vehicle at installation locations at which an increased ambient temperature prevails. As a result, the dissipation of the power loss of the electric drive unit and the electric control unit is made more difficult. Furthermore, the power loss in the electric drive unit and in the electric control unit rises more and more as a result of increasing miniaturization of the vehicle components, with the result that the electric components of the electric actuators have to be operated at increased operating temperatures.

The operating temperature of friction clutches usually is detected and reduced by a cooling oil, as known, for example, from DE 10 2008 026 553 A1. Electric components of the actuator system that are not cooled sufficiently may require deactivation or can lead to failure or destruction of the electric components.

It is therefore the object of the invention to provide an electric actuator that can be operated reliably and over the long term even at elevated temperatures.

SUMMARY OF THE INVENTION

The invention relates to an electric actuator for a clutch arrangement of a motor vehicle having an electric drive unit where a cooling element has a coolant line through which a coolant can be conducted to dissipate heat from the electric components. The invention also relates to a clutch arrangement having such an electric actuator. The invention further relates to a motor vehicle drive train that has a clutch arrangement with such an electric actuator to actuate the clutch arrangement. Finally, the invention relates to a motor vehicle with a coolant circuit connected to the coolant line of the cooling element of the electric actuator to feed coolant to the coolant line.

The cooling element is assigned a coolant line through which a coolant can be conducted. Thus, the electric components of the electric drive unit and the electric control unit can be cooled effectively to an optimum operating temperature independently of the ambient temperature. As a result, optimum operation of the electric components is possible and the probability of thermally induced deactivation or thermally induced failure or thermally induced destruction can be reduced. As a consequence, the electric actuator can operate reliably even at high ambient temperatures.

The cooling element may have a shielding element that shields the cooling element with respect to the surroundings. As a result, the influence of the ambient temperature on the cooling element can be reduced, and the cooling of the electric components becomes more efficient.

The shielding element may have an absorption layer to reduce heating of the cooling element as a result of thermal radiation. As a result, the influence of hot components in the surroundings of the cooling element as a result of thermal radiation can be reduced, and cooling of the electric components becomes even more efficient.

The cooling element may be arranged between the shielding element and the electric components. As a result, the cooling element can be mounted on the electric components with low technical complexity and can be brought into thermal contact with the electric components and at the same time can be shielded effectively from hot components of the surroundings.

The cooling element may be arranged in the electric drive unit and/or in the control unit. As a result, the electric components of the drive unit and the control unit can be cooled effectively and directly.

The electric actuator may have a housing in which the electric drive unit, the electric control unit and the cooling element are accommodated. As a result, a compact overall design of the electric actuator can be achieved. The compact overall design can be mounted in a motor vehicle with low complexity and at the same time is shielded with respect to the ambient temperature.

The cooling element may have a coolant circuit to conduct the coolant through the coolant line. As a result, effective cooling and effective dissipation of the waste heat of the electric components is possible, since the waste heat can be transported to a remote cooler location by way of the coolant circuit.

An existing cooling circuit of the motor vehicle may be connected to the coolant line. As a result, the existing cooling performance of the motor vehicle can be utilized effectively and the electric components of the electric actuator can be cooled to an optimum operating temperature.

The clutch arrangement may be arranged between the drive unit and an electric motor to separate the drive unit from the electric motor and to make a purely electric drive of the motor vehicle possible. As a result, an electric actuator can be operated reliably in hybrid vehicles at high ambient temperatures.

The invention provides effective cooling of the electric actuator and increases the reliability of the electric components of the actuator and makes an installation location in the direct vicinity of very hot components of the motor vehicle possible.

Features mentioned above and those explained in the following text can be used not only in the specified combination, but also in other combinations or on their own, without departing from the scope of the invention.

Exemplary embodiments of the invention are shown in the drawings and will be explained in greater detail in the following description.

DETAILED DESCRIPTION

Figure 1:
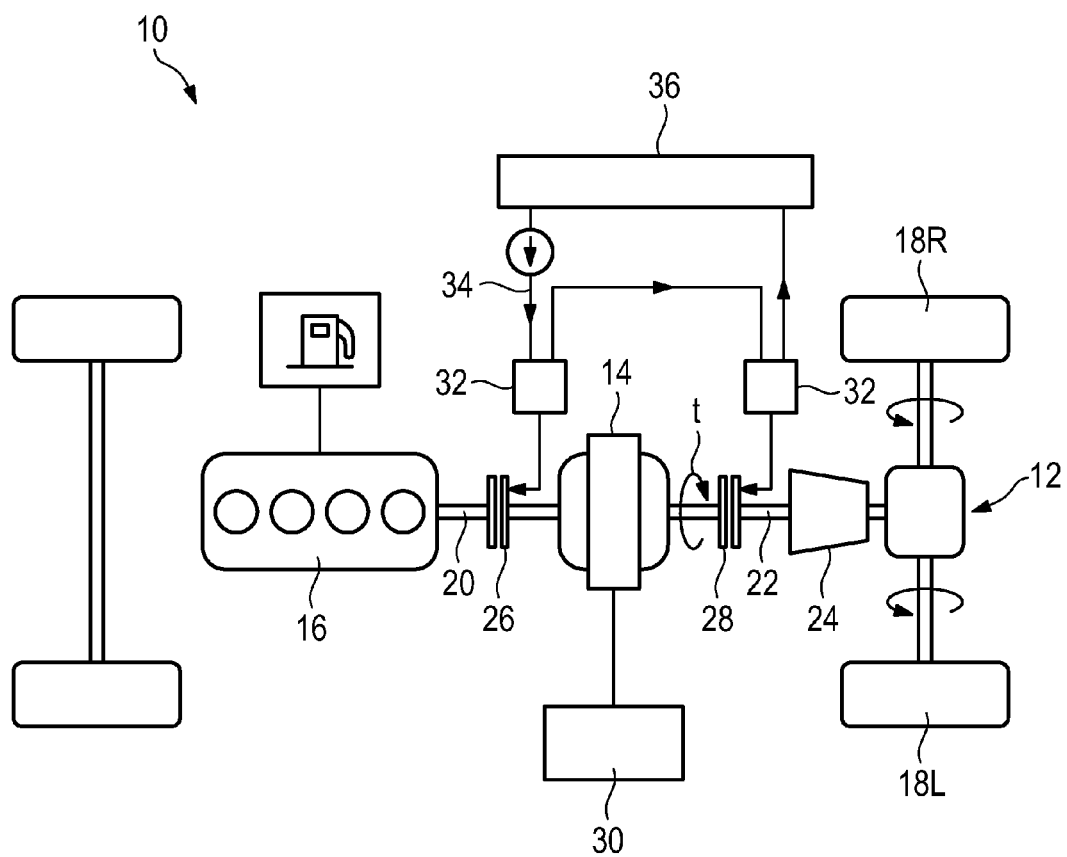
FIG. 1 is a diagrammatic view of a motor vehicle having a hybrid drive train and electrically actuable clutches.

FIG. 1 diagrammatically shows a motor vehicle denoted in general by 10. The motor vehicle 10 has a drive train 12 that comprises an electric machine 14 and an internal combustion engine 16 for providing drive power. The drive train 12 drives driven wheels 18L, 18R of the motor vehicle 10 and is configured as a parallel hybrid drive train in the form shown here.

The internal combustion engine 16 is connected or can be connected to the electric machine 14 via a crankshaft 20. The internal combustion engine 16 and the electric machine 14 provide a torque t on an output shaft 22 that rotates at an adjustable rotational speed. The output shaft 22 is connected or can be connected to a transmission unit 24 to transmit the torque t to the driven wheels 18R, 18L. The crankshaft 20 and the output shaft 22 each have a clutch 26, 28 to connect the internal combustion engine 16 to the electric machine 14 and the electric machine 14 to the transmission unit 24. The electric machine 14 is assigned a motor control unit 30 that controls or energizes the electric machine 14 and correspondingly switches over between motor and generator operation.

Each clutch 26, 28 has an electric actuator 32, which in each case has an electric drive unit for providing a mechanical driving force and an electric control unit for controlling the electric drive unit. The driving force of the electric actuators 32 opens or closes the clutches 26, 28 mechanically to connect the internal combustion engine 16 to the electric machine 14 or the electric machine 14 to the transmission unit 24. Each electric actuator 32 has a cooling element that is connected to a coolant line 34 to cool the electric components of the electric drive unit and the electric control unit. The coolant line 34 is connected to a radiator 36 of the motor vehicle 10 to feed a coolant to the cooling element of the electric actuators 32. As a result, the electric components of the electric actuators 32 can be cooled effectively and operated at an optimum operating temperature.

Figure 2:
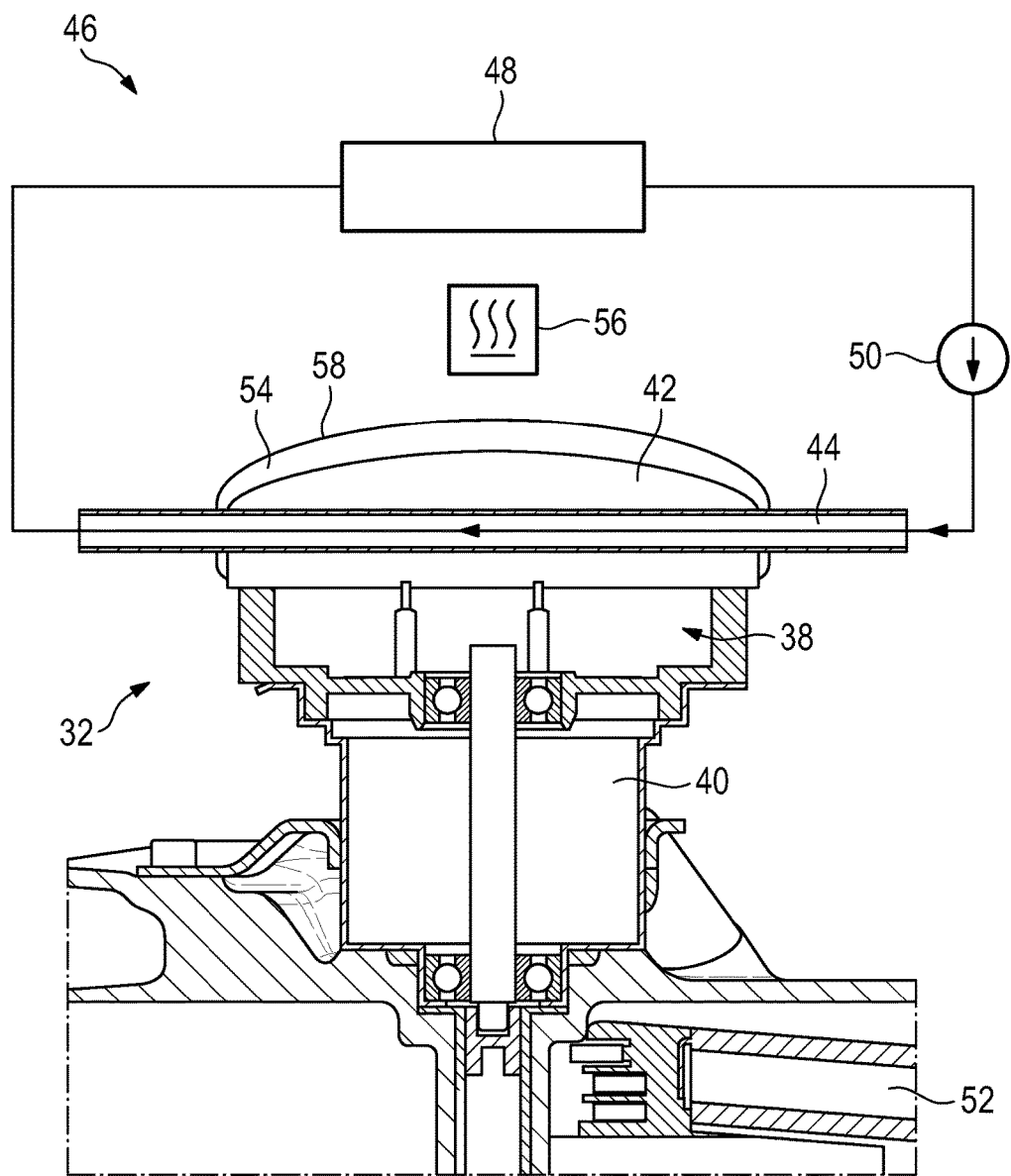
FIG. 2 is a diagrammatic sectional view of an electric actuator for a clutch arrangement having fluid cooling.

FIG. 2 is a diagrammatic sectional view of one of the electric actuators 32. The electric actuator 32 has an electric control unit 38 and an electric drive unit 40. The electric drive unit 40 is an electric motor and can provide a linear movement for actuating the clutches 26, 28 via a spindle (not shown in greater detail). The electric control unit 38 actuates and energizes the electric drive unit 40 and controls the driving force provided by the drive unit 40. The clutches 26, 28 can be opened or closed in this way.

To energize the electric drive unit 40, the electric control unit 38 generally has power switches or power semiconductors that are heated during operation and emit a thermal power loss.

The electric actuator 32 has a cooling element 42 assigned to the electric components of the electric control unit 38 and/or to the electric components of the electric drive unit 40 to dissipate the thermal power loss produced in the electric components. The cooling element 42 has a coolant line 44 routed through the cooling element 42. The coolant line 44 is connected to a cooling circuit 46 that supplies the coolant line with coolant and conducts the coolant through the coolant line 44. The cooling circuit 46 has a radiator 48 that cools the coolant and dissipates the thermal energy contained in the coolant to the surroundings. Furthermore, the cooling circuit 46 has a coolant pump 50 to circulate the coolant in the coolant line 44 and to feed it to the cooling element 42. The cooling circuit 46 is preferably the cooling circuit of the motor vehicle 10 that usually cools the internal combustion engine 16. As a result, the existing cooling circuit 46 can be utilized for cooling the electric components of the electric actuator 32.

The electric actuator 32 is assigned to a friction clutch 52 that is indicated merely diagrammatically in FIG. 2. The electric actuator 32 is configured to transmit the driving force generated by the electric drive unit 40 to the friction clutch 52 and to correspondingly open or close the friction clutch 52.

The cooling element 42 also is assigned a shielding element 54 to shield the cooling element 42 from hot surroundings or hot components in the motor vehicle 10 which are denoted in general by 56 in FIG. 2. The shielding element 54 has an absorption layer 58 that is configured to reduce the thermal transfer to the shielding element 54 by way of thermal radiation. The absorption layer 58 can have a coating that reflects thermal radiation to an increased extent and therefore reduces the thermal transfer to the cooling element 42.

In the illustrated embodiment, the cooling element 42 is between the shielding element 54 and the electric control unit 38. However, the cooling element 42 also can be arranged within the electric control unit 38, within the electric drive unit 40 or between the electric control unit 38 and the electric drive unit 40 to optimize the cooling.

What is claimed is:

1. An electric actuator for a clutch arrangement of a hybrid motor vehicle that has an internal combustion engine and an electric machine for providing drive power for the hybrid motor vehicle, the electric actuator comprising:
   an electric drive unit for providing mechanical driving force;
   an electric control unit connected to the electric drive unit to control the electric drive unit, and
   a cooling circuit having at least one coolant line that carries a coolant for cooling the internal combustion engine, the cooling circuit including a radiator that dissipates thermal energy in the coolant to the surroundings, thereby cooling the coolant, the cooling circuit further having a cooling element that is connected thermally to electric components of the electric drive unit and/or the electric control unit, the cooling element being connected to the coolant line that communicates with the radiator so that the coolant that has been cooled at the radiator can be conducted through the cooling element to dissipate heat from the electric components.

2. The electric actuator of claim 1, further comprising a shielding element between the cooling element and at least one heat generating component of the motor vehicle for thermally shielding the cooling element with respect to the at least one heat generating component.

3. The electric actuator of claim 2, wherein the shielding element has an absorption layer on a side of the shielding element facing the heat generating component to reduce heating of the cooling element as a result of thermal radiation.

4. The electric actuator of claim 2, wherein the cooling element is arranged between the shielding element and the electric components.

5. The electric actuator of claim 2, wherein the cooling element is arranged in the electric drive unit and/or in the electric control unit.

6. The electric actuator of claim 1, wherein the electric actuator has a housing, in which the electric drive unit, the electric control unit and the cooling element are accommodated.

7. A clutch arrangement for a drive train of a motor vehicle having the electric actuator of claim 1 for providing a driving force for actuating the clutch arrangement.

8. A hybrid motor vehicle drive train for a hybrid drive, comprising:
    a drive unit with an internal combustion engine and an electric machine for providing drive power, the drive unit being connected to a clutch arrangement for transmitting the drive power, the clutch arrangement having an electric actuator to actuate the clutch arrangement;
    an electric control unit connected to an electric drive unit to control the electric drive unit; and
    a cooling circuit having at least one coolant line that carries a coolant for cooling the internal combustion engine, the cooling circuit including a radiator that dissipates thermal energy in the coolant to the surroundings, thereby cooling the coolant, the cooling circuit further having a cooling element that is connected thermally to electric components of the electric drive unit and/or the electric control unit, the cooling element being connected to the coolant line that communicates with the radiator so that the coolant that has been cooled at the radiator can be conducted through the cooling element to dissipate heat from the electric components.

\* \* \* \* \*